W. Hinds,
Rotary Pump,
N° 43,849.   Patented Aug. 16, 1864.

Witnesses
Andrew Whitely
R.D.O. Smith

Inventor
W<sup>m</sup> Hinds

UNITED STATES PATENT OFFICE.

WILLIAM HINDS, OF LITTLE FALLS, NEW YORK.

IMPROVEMENT IN ROTARY PUMPS.

Specification forming part of Letters Patent No. 43,849, dated August 16, 1864; antedated August 1, 1864.

*To all whom it may concern:*

Be it known that I, WM. HINDS, of Little Falls, county of Herkimer, and State of New York, have invented a new and useful Improvement in Rotary Pumps; and I hereby declare the following to be a full, clear, and exact description of the construction and operation of the same, reference being had to the accompanying drawings, making a part of this specification, and to the letters of reference marked thereon.

The invention consists of a rotary pump of peculiar construction, the novelty of it being confined almost exclusively to the drum and valves. The former, however, (if it may be so-called,) making but little more than the skeleton of a drum, forming less than half the periphery thereof, leaving the valves to make up the deficiency.

The power to operate the pump is produced by an endless chain working over spur-wheels, to the shaft of one of which wheels a gear-wheel is secured, which meshes into a pinion on the shaft of the pump. There is but little, if anything, strictly new in the rotary power, unless it be in the mode of operating it.

To enable others to make and use my invention, I will now describe its construction and operation.

Figure 1:
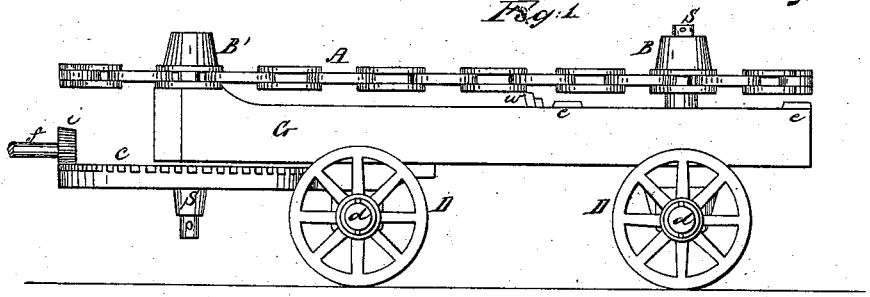
Figure 2:
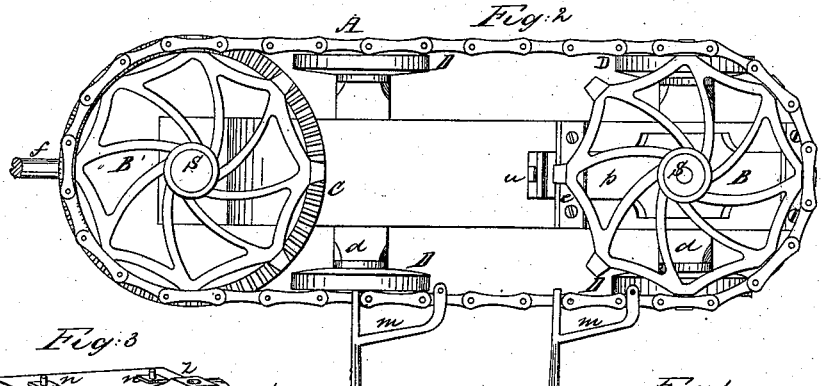
Figure 3:
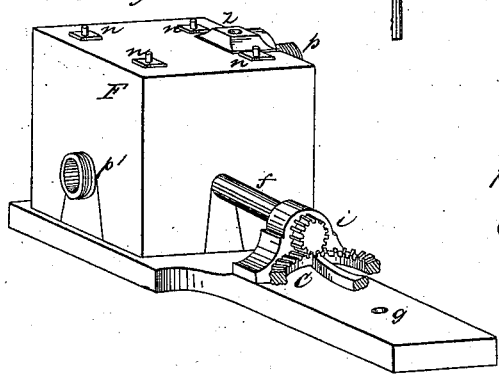
Figure 4:
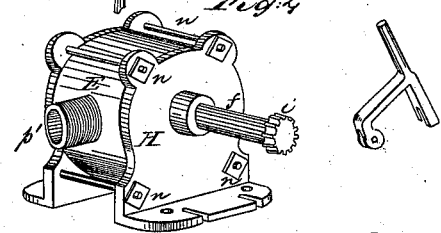
Figure 5:
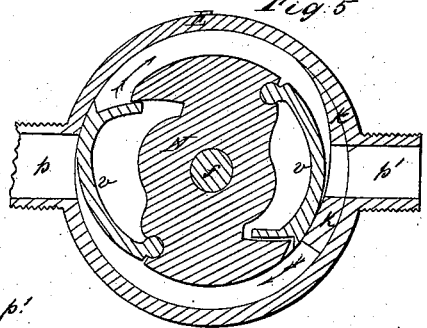
Figure 6:
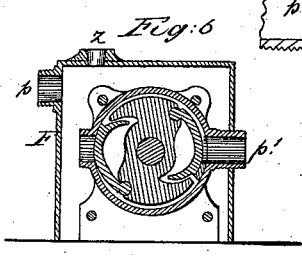

Figure 1 of the drawings is a side elevation of the rotary power. Fig. 2 is a top plan of the same. Fig. 3 is the rotary pump inclosed in a chest or case. Fig. 4 is a perspective view of the pump. Fig. 5 is a sectional elevation shown through the center of the cylinder at right angles to the shaft or axis. Fig. 6 is a sectional elevation shown through the center of the chest and pump, to show the position of the induction-ports.

The same kind of letters refer to like parts throughout.

A, Fig. 1 and 2, is an endless chain that works over the spur-wheels B and B'.

C is a gear-wheel connected at the lower end to the shaft S, to which B' is secured, the shaft working in boxes at the end of the carriage G. The carriage-body is only a timber to secure the wheels to. At the rear end is a plate, *b*, that slides in grooves in the carriage-body, and has an axle, *s*, embodied with it for wheel B to turn on. The plate *b* has a turn upward at one end against the stud *u*, between which and the turn a wedge or other devices may be used to spread the wheels apart to tighten the chain.

*e* are cross-bars secured to the carriage-body over the plate *b* to hold and steady it in its place. D are the carriage-wheels, and *d* are the axles on which they turn.

*m* is a kind of crotched lever or handle to work over every alternate link of the chain, the long arm of which extends back to serve as a brace to support the straight part of the lever in a position at right angle to the chain. This power is to be operated by manual labor; the operatives to draw around by the levers. The axle or journal at the lower end of the shaft S, to which the wheel B' and wheel C are secured, works in boxes at *g*, Fig. 3, and shows with the section of the wheel C, under the pinion *i*, the method of working the pump by the rotary power.

F, Fig. 3, is a chest or case secured to the platform by the bolts *n*. It incloses the pump, and should be made and packed water-tight to hold water over the top of the pump; the object for doing it being to prevent the pump from sucking air to lessen its efficiency while it is in operation, and also to prevent it from corroding or rusting.

*p*, Figs. 3 and 6, is the induction-port, secured to the chest on a level with the top of the chest, thereby keeping the chest full of water while the engine is in operation. Through the top of the chest at *z* is an aperture, through which to fill it with water before operating it.

*p'* is the discharge-port, and stands opposite to the induction-port as may be seen in the drawings, Fig. 5.

Fig. 4 is a perspective view of the pump out of the chest. E is the cylinder. H are the cross-heads secured to the cylinder by the bolts *n*. *p'* is the discharge-port. *f* is the shaft, and *i* the pinion. The cross-heads have feet at their bottom ends to secure them to platforms or other supports. Fig. 5 is a sectional elevation showing on a larger scale the construction and form of the drum and abutment forming the cut-off. The cylinder is made on a perfect circle.

*k* is the abutment that forms the cut-off, and is fitted and secured to the cylinder over the port $p'$, and has a corresponding port through it for the discharge of the water.

N is a part that I will denominate the "skeleton" of the drum and to which the valves $v$ are secured by a kind of hinge at their rear ends. The ends of the skeleton and the valves are constructed on regular curves on their outsides, so as when the valves are closed into the skeleton to form a perfect drum or cylinder.

$f$ is a shaft that goes through the skeleton of the drum and turns in boxes in the crossheads. The box on the end of the pump (not shown) does not go clear through the projection forming it, making no packing necessary at that end; packing may be needed at the end in sight, especially when the pump is to be run out of water. The skeleton unless made hollow is much heavier than necessary as shown by drawing. The shaft might be cast with the skeleton, and in that case it would require only a connecting-bar between the curved ends. The shaft is concentric with the cylinder, making the water channel equal throughout its circuit, except against the cut-off. The arrows indicate the way the valves move. The position of the valve standing against the abutment shows the manner in which they work to keep the drum constantly in a cylindrical form on the outside next to the cut-off, while the other valve, driving a body of water before it in a channel outside of the center on which the valve turns, will keep the out end firmly in contact with the cylinder.

The pump and power may be used separately for other purposes. The pump to be used for throwing water as a fire-engine will need to be run in the position shown. To draw or lift water from wells, cisterns, &c., the pump should be run under water and in a horizontal position. To run it in this way, it may be necessary to secure springs in the bottom of the notches in the skeleton, into which the cross-turns at the end of the valves work to give them a start cut after they have passed the cut-off; and it may also be necessary to make the cross-heads fit loosely to the valves between the cut-off and the point from whence they start out, or off from the skeleton, to come into contact with the cylinder.

It will be readily seen by a mechanical observer that the power driving a pump of common size will not produce motion enough for a fire-engine. To compensate for this deficiency, the diameter of the pump or its capacity must be enlarged. If the pump is twelve inches in diameter, the circumference will be three feet, throwing a stream that length at every revolution. If the diameter is twenty inches, the stream will be five feet in length. If the ports of the pump should be doubled in size, it would then throw twice as much water, and if forced through a nozzle of the same size the speed would be doubled; hence the way to regulate the engine for any speed required.

This engine will cost but little more than half what the common engine costs; it will be much more durable; is more simple, and can be worked by men, women, or children, as no skill or practice will be needed, and any one that can walk and draw twenty pounds can work to advantage upon it.

I am well aware that horse-powers have been constructed from endless chains working over spur-wheels, producing power and motion from horses walking on floors secured to endless chains; but I cannot learn that endless chains have ever been operated by drawing from levers or other devices attached to them; herefore

What I claim as my invention, and wish to secure by Letters Patent of the United States, is—

1. The combination and arrangement of the cylinder E, drum N, valves $v\ v$, and abutment $k$, substantially as shown and described.

2. The arrangement of the above-described parts within a chest, the induction-port of which is above the induction-port of the pump, so that the pump may be kept submerged when at rest or when being transported from place to place in its ordinary use.

3. In combination with parts E, N, $v\ v$, and $k$, the chain A, spur-wheels B B', shaft $s$, and wheel $c$, as connected with shaft $f$.

4. The combination, with said chain as arranged, of handles, substantially as described.

WM. HINDS.

Witnesses:
ANDREW WHITELEY,
R. D. O. SMITH.